(12) United States Patent
Fukasawa et al.

(10) Patent No.: US 7,289,128 B2
(45) Date of Patent: Oct. 30, 2007

(54) IMAGE PROCESSING DEVICE

(75) Inventors: Kenji Fukasawa, Nagano-ken (JP); Shun Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 393 days.

(21) Appl. No.: 11/094,937

(22) Filed: Mar. 30, 2005

(65) Prior Publication Data

US 2005/0231524 A1    Oct. 20, 2005

(30) Foreign Application Priority Data

Mar. 31, 2004  (JP) ............................ 2004-101896
Oct. 21, 2004  (JP) ............................ 2004-306417

(51) Int. Cl.
*H04N 1/48* (2006.01)
*H04N 9/68* (2006.01)
*G09G 5/02* (2006.01)
*G03F 3/08* (2006.01)
*G06K 9/48* (2006.01)
*G06K 9/00* (2006.01)
*H04N 9/73* (2006.01)

(52) U.S. Cl. ...................... 345/590; 345/589; 345/591; 348/225; 348/234; 348/645; 358/516; 358/518; 358/520; 382/162; 382/167; 382/274

(58) Field of Classification Search ........ 345/589–593, 345/597, 606, 617–618; 348/223, 225, 228, 348/234, 235, 251, 645–647, 659–663; 358/512, 358/516, 518–521; 382/162, 167, 254, 274
See application file for complete search history.

(56) References Cited

U.S. PATENT DOCUMENTS 6,360,008 B1 *  3/2002  Suzuki et al. ............... 382/167

2006/0256214 A1 * 11/2006 MacLean et al. ........... 348/234

FOREIGN PATENT DOCUMENTS

JP    2000-032482    1/2000

OTHER PUBLICATIONS

Abstract of Japanese Patent Publication No. 2000-032482, Pub. Date: Jan. 28, 2000, Patent Abstracts of Japan.

* cited by examiner

*Primary Examiner*—Wesner Sajous
(74) *Attorney, Agent, or Firm*—Martine, Penilla & Gencarella, LLP

(57) ABSTRACT

The image processing device of the present invention maps signal values on saturation segments to corresponding signals on an achromatic axis. In conjunction with this, mapping of color signal present around the saturation segments is mapped while preserving the continuity prior to mapping. The image processing device determines the displacement level entailed in mapping color signal surround a saturation segment so as to be inversely proportional to distance from the saturation segments. Since chroma of signals on the saturation segments change precipitously before and after mapping, by mapping signal surround the saturation segments so as to preserve the continuity of the original signals of signals surround the saturation segments, chroma gradation of signals on the saturation segments and signals around saturation segments can be preserved with a high degree of accuracy.

15 Claims, 17 Drawing Sheets

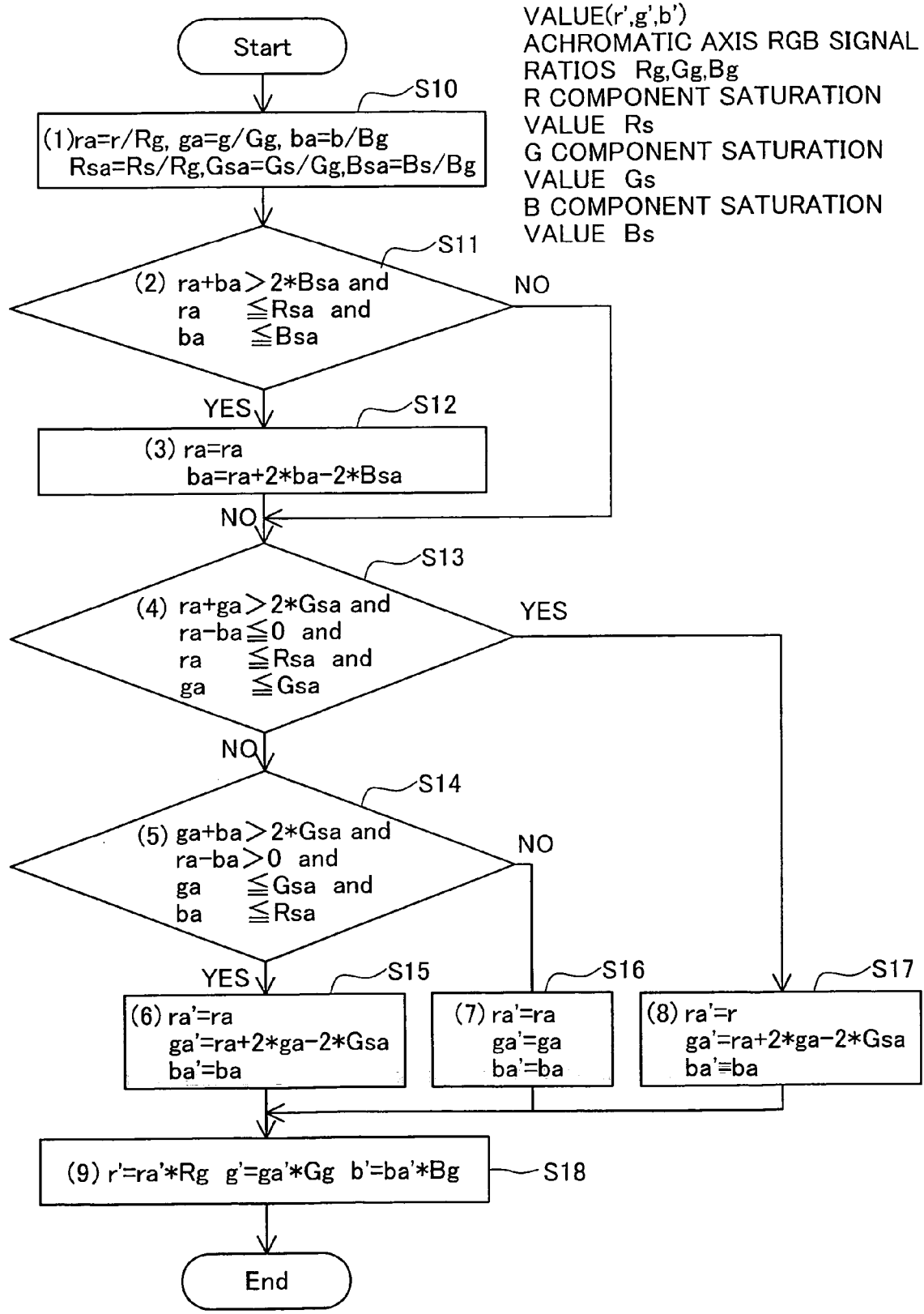

Fig.11a
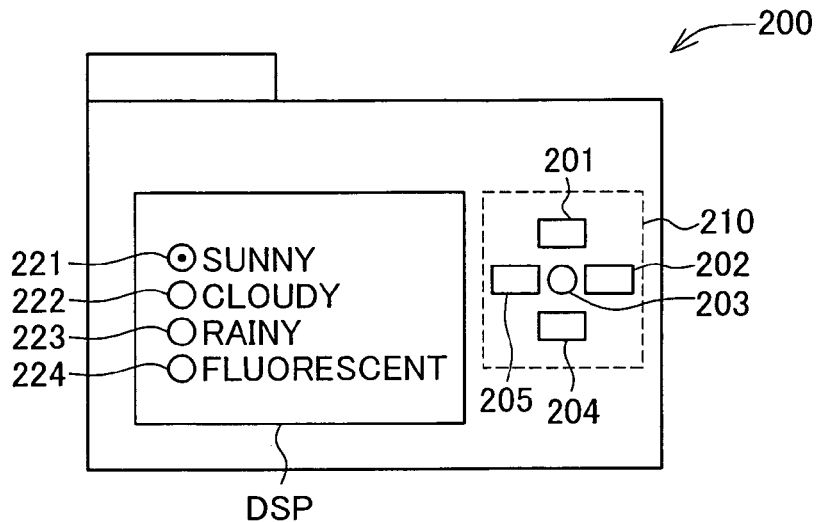
Fig.11b
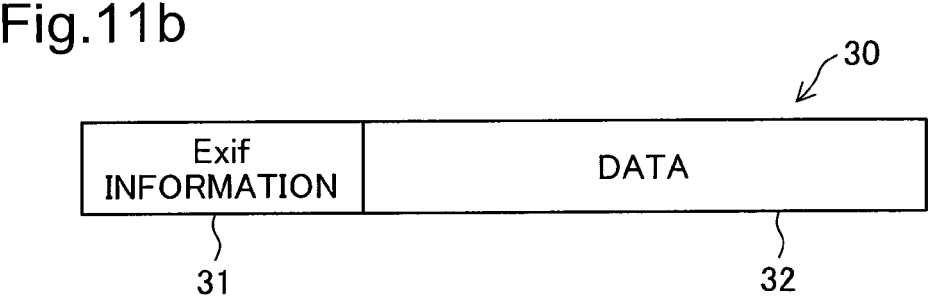
Fig.11c
| Exif INFORMATION | |
|---|---|
| IMAGE TITLE | file05.jpg |
| SHOOTING DATE | 2004/6/10 10:25:30 |
| COLOR SPACE INFORMATION | sRGB |
| ILLUMINANT INFORMATION | SUNNY |
| EXECUTED IMAGE WIDTH | 1712(Pixel) |
| EXECUTED IMAGE HEIGHT | 1368(Pixel) |
| ISO SENSITIVITY | 100 |
| EXPOSURE TIME | 0.0125(sec) |
| APERTURE VALUE | 3.60 |

170

| ILLUMINANT TYPE | Rgain | Ggain | Bgain |
|---|---|---|---|
| INCANDESCENT | 1.20 | 1.00 | 2.44 |
| FLUORESCENT | 1.67 | 1.00 | 2.19 |
| SUNNY | 1.90 | 1.00 | 1.71 |
| CLOUDY | 2.05 | 1.00 | 1.57 |

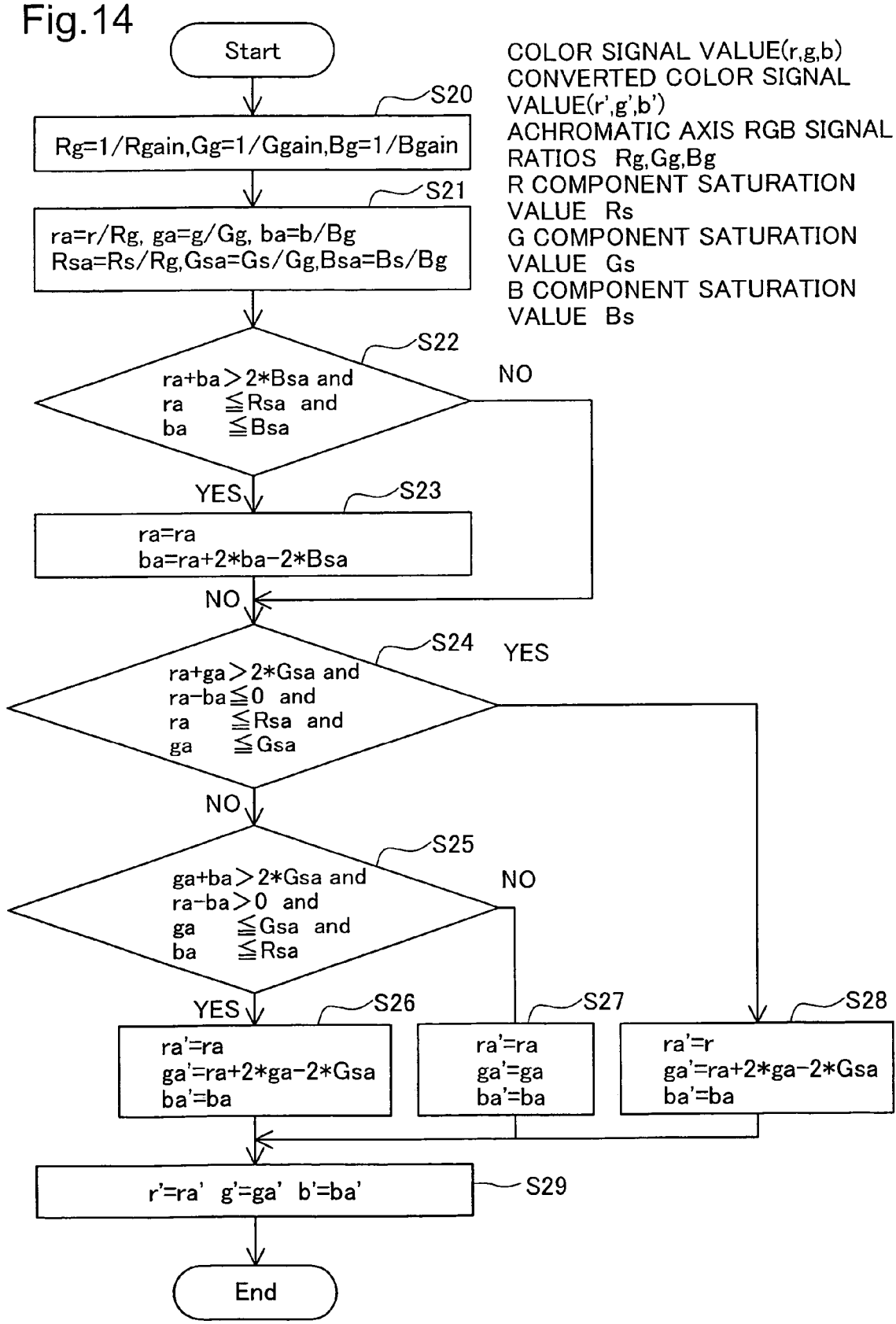

IMAGE PROCESSING DEVICE

BACK GROUND OF THE INVENTION

1. Field of the Invention

The present invention relates to an image processing method, and relates in particular to color suppression of photographed images.

2. Description of the Related Art

In recent years, digital cameras that use CCDs (Charge Coupled Devices) to shoot images have become widespread. Transmittance of a pass filter of the imaging element differs by color, and color saturation signal values differ by color as well. Thus, in a photographed image, as a result of signal values of colors reaching saturation not simultaneously but rather sequentially, in areas of high luminance, there can occur the phenomenon of "false color" whereby color that is not inherently present in the area is applied to it, so that color is not reproduced accurately.

In order to address this problem, there has been disclosed a technique of using luminance information in a photographed image to suppress color signal gain in high luminance areas, in order to reduce chroma and suppress the occurrence of false color.

However, with the technique mentioned above, since gain is suppressed over a wide spectrum, chroma becomes reduced even for color signals that are not at saturation. Accordingly, in a high luminance area having a luminance signal above a certain level, chroma is suppressed completely so that tone gradations cannot be preserved, resulting in the problem of color loss.

SUMMARY OF THE INVENTION

With the foregoing in view, it is an object of the present invention to restrain the occurrence of false color, as well as preserve tone information of the original color signals.

In order to solve at least in part the problem described above, the first invention has the following structure. Specifically, it essentially resides in An image processing method off processing an image data being presented in a color space that is defined with color components of three colors, the method comprising:

mapping a first part and a second part of color signal to an achromatic axis defined on the basis of an arbitrary illuminant, wherein one color is saturated in the first part of the signal and two colors are saturated in the second part of the signal; and mapping a surround color signal surrounding the saturated color signal so as to preserve chroma gradations of the surround color signal, toward the achromatic axis.

According to the present invention, the occurrence of false color can be suppressed, while carrying out tone reproduction that preserves chroma gradations of the original signals.

The invention in a second arrangement thereof essentially resides in An image processing method implemented by an image processing device when the image processing device photographed bright achromatic color, in a color coordinate system defined by color components of three colors, the method comprising:

defining a first saturation point at which, of the color components of three colors, a first color component is saturated, a second saturation point at which the first color component and a second color component are saturated, and a third saturation point at which the first color component, the second color component, and a third color component are saturated;

mapping signal on saturation segments that are configured by connecting the first saturation point and the second saturation point, and the second saturation point and the third saturation point, to an achromatic axis defined on the basis of an arbitrary illuminant;

setting an area of predetermined range from the saturation segments as a candidate area for mapping; and mapping color signal within the candidate area for mapping toward the achromatic axis, with varying the shift level associated with mapping, depending on distance from the saturation segments to color signal within the candidate area for mapping.

According to the present invention, image processing device is able to map with preserving continuity of chroma, not only for saturated color signals but for color signals surrounding the saturated color signals as well. Accordingly, image processing device is able to restrain the occurrence of false color, whereby areas of high luminance become discolored when bright achromatic color is photographed, and to reproduce gradations of chroma of the original color signals with high accuracy.

These and other objects, features, aspects, and advantages of the present invention will become more apparent from the following detailed description of the preferred embodiments with the accompanying drawings.

BRIEF DESCRIPTION OF THE DRAWINGS

FIG. 4 is flowchart showing the color suppression process in the first embodiment;

FIG. 11a is an illustration showing the environmental conditions in the second embodiment;

FIG. 11b is an illustration showing the structure of the image data in the second embodiment;

FIG. 11c is an illustration showing the Exif Informarion in the second embodiment;

FIG. 14 is a flowchart showing the color suppression process in the second embodiment;

DESCRIPTION OF THE PREFERRED EMBODIMENT

A. First Embodiment

A1. System Arrangement

Figure 1:
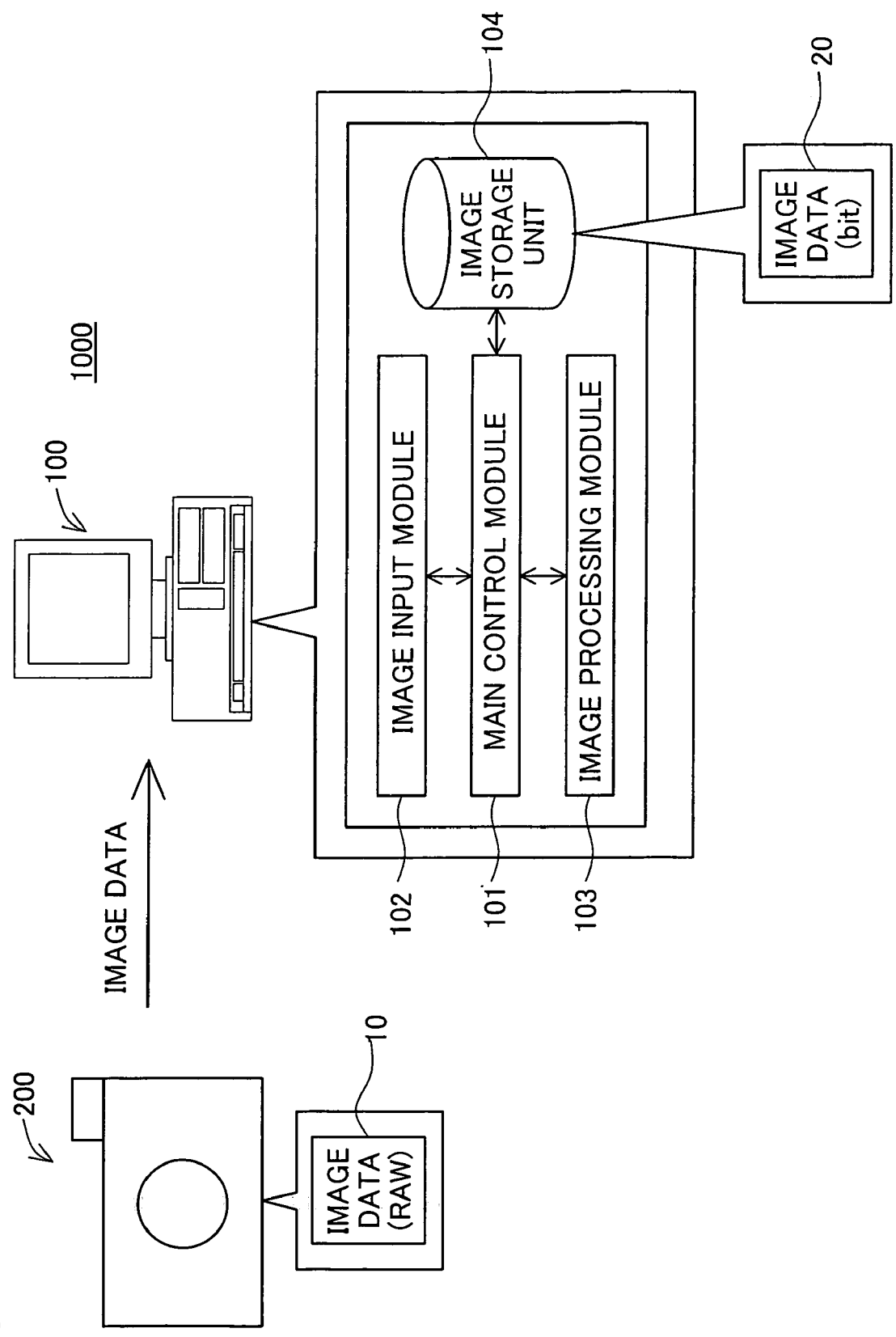
FIG. 1 is illustration showing in exemplary fashion the system arrangement of the image processing system in the first embodiment.

FIG. 1 is an illustration explaining in exemplary fashion the system arrangement of the image processing system 1000 of the first embodiment. The image processing system 1000 includes an image processing device 100 and a digital camera 200. The digital camera 200 has a CCD as the image sensor. The digital camera 200 is able to shoot images. Shot images are created in RAW format, and recorded as image data 10 on a memory card, not shown. In the first embodiment, a CCD is provided as the image sensor, but it would be possible instead to employ a CMOS (Complementary Metal Oxide Semiconductor) or the like.

The image processing device 100 is an ordinary computer. When the image processing device 100 is input image data 10 from the digital camera 200. The image processing device 100 performs image processing including color suppression processing on the image data 10, and converts it to image data 20 of bitmap format.

The functional blocks of the image processing device 100 are also shown in the drawing. The image processing device 100 has a main control module 101, an image input module 102, an image processing module 103, and an image storage unit 104. The image storage unit 104 has a predetermined area of the hard disk drive 107 of the image processing device 100. The other functional blocks are implemented as software, and are controlled by the main control module 101. The functional blocks could instead be implemented as hardware.

The image input module 102 inputs image data 10 that is targeted for processing, and handing the image data over to the image processing module 103. The image processing module 103 performs image processing including color suppression processing on the image date handed over from the image input module 102, and convert it to image data 20. The specifics of image processing will be described later. The main control module 101 receives the converted image data 20 from the image processing module 103 and records it in the image storage unit 104.

A2. Image Processing

Figure 2:
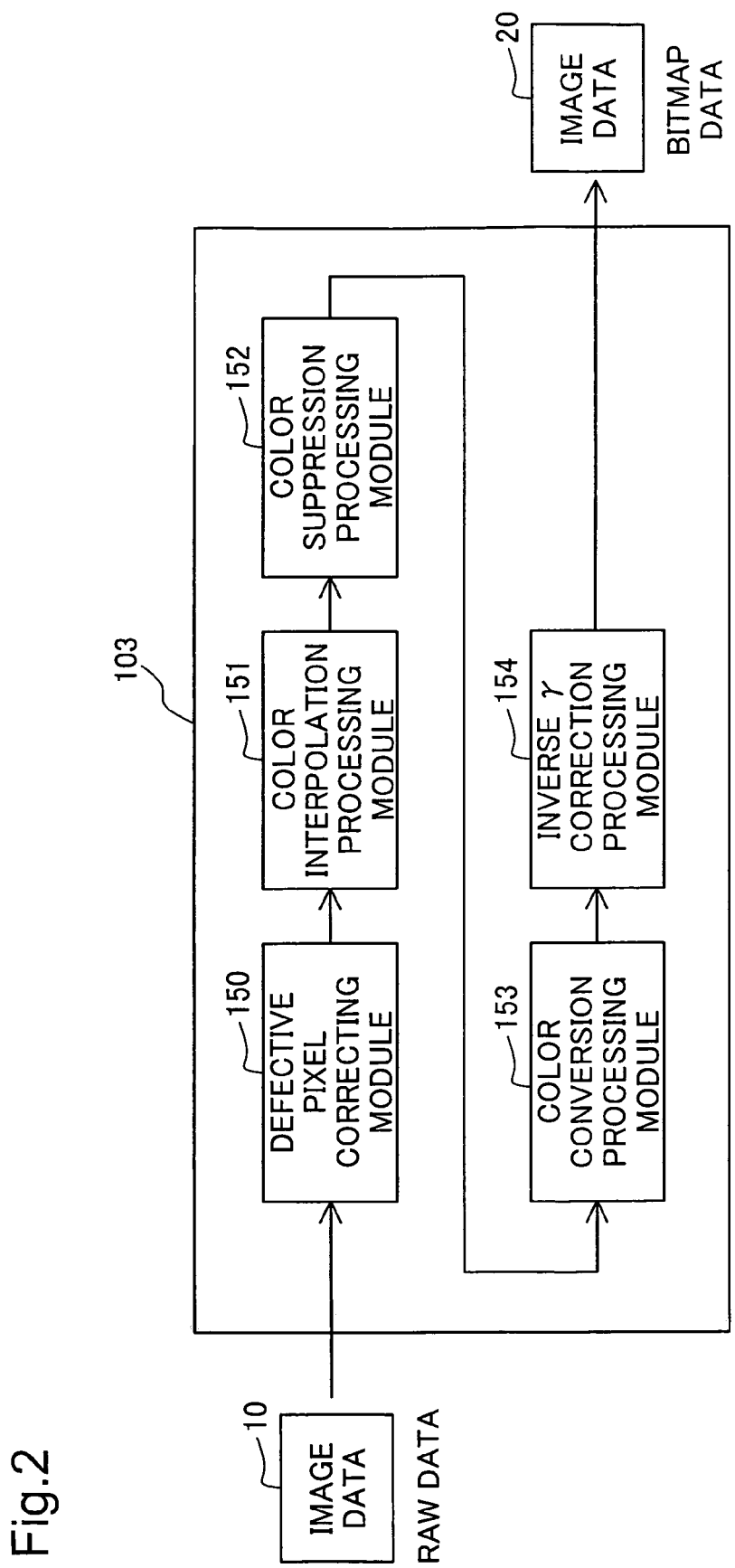
FIG. 2 is flowchart showing image processing in the first embodiment.

FIG. 2 is a flowchart explaining image processing in the first embodiment. As shown, the image processing module 103 has, as functional blocks, a defective pixel correcting module 150, a color complement processing module 151, a color suppression processing module 152, a color conversion processing module 153, and an inverse γ correction processing module 154. The image processing module 103 begins the image processing when the image processing module 103 receives the image data 10 from the image input module 102

When input of image data 10 is detected, the defective pixel correcting module 150 performs processing on the image data 10 to correct any defective pixels. A defective pixel refers to, in the case that a defective pixel is included in the pixels that make up the image sensor, to a pixel that corresponds to this defective pixel in the shot image data 10; such pixel data is set of inaccurate signal information having been set. On the basis of signal information of pixels surrounding the defective pixel, the defective pixel correcting module 150 corrects the pixel value of the defective pixel.

The color complement processing module 151 executes color complement processing on the defect-corrected image data. Color complement processing refers to a process of calculating color components other than filter color for each pixel datum of the image data 10, filling in any missing data for each data point so that each now has pixel values of the R, G, and B color components. By means of complement processing, RGB data in a color space dependent on the device characteristics of the digital camera 200 is created. In the first embodiment, since a CCD is employed as the image sensor, the color space so created shall be termed the CCDRGB color space.

The color suppression processing module 152 executes color suppression processing on the image data 10 having undergone color complement processing. Color suppression processing is a process that modifies the R, G, and B color components to suppress chroma. The color suppression process suppresses the occurrence of false color or color loss due to differences in filter transmittance by color component. The process constitutes a substantial part of the invention, and will be described in detail later.

The color conversion processing module 153 executes color conversion processing on the image data 10 having undergone color suppression processing. Color conversion processing is a process for converting to a color space appropriate for a particular purpose. In the first embodiment, since the CCDRGB color space is employed, conversion to the RGB color space performed.

Inverse γ correction processing module 154, using a gamma value that indicates characteristics of the output device, executes inverse gamma correction on the image data 10 having undergone color conversion processing.

The image processing module 103 performs the processes mentioned above, converting the RAW format image data 10 to image data 20 of bitmap format. The image data 20 is recorded in the image storage unit 104.

In addition to the processes mentioned above, the image processing module 103 may also execute typical picture quality adjustments such as color balance (white balance), contrast, hue, and sharpness corrections, and the like.

A3. Color Suppression Process

Figure 3A:
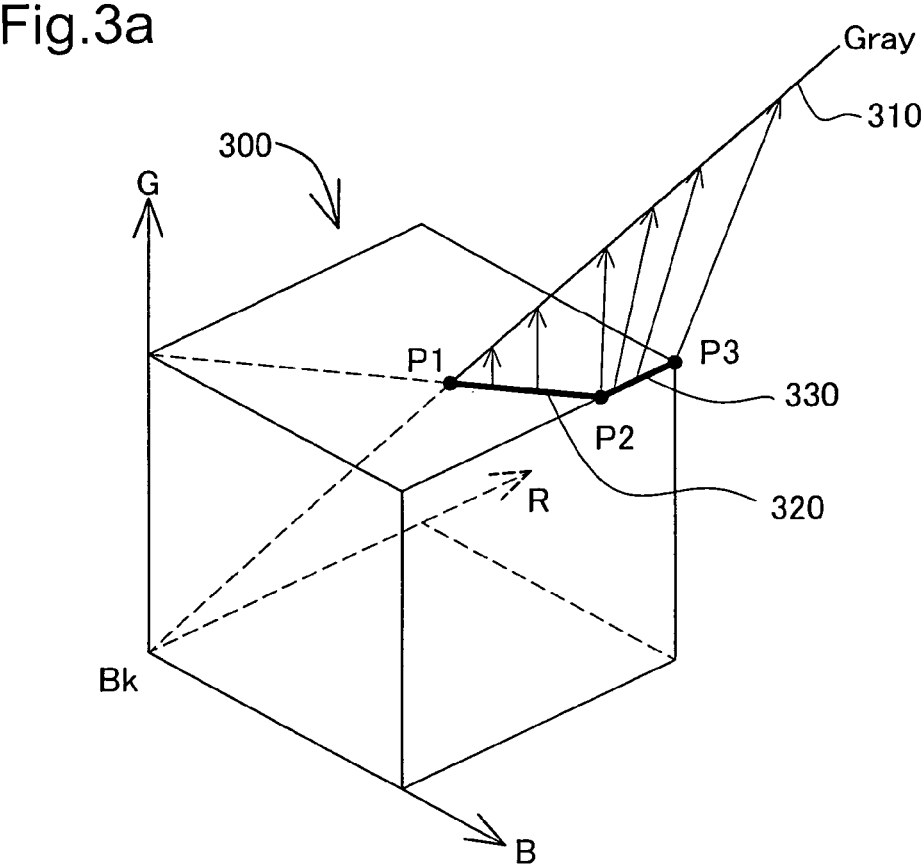
FIGS. 3a and 3b schematically illustrate the color suppression process in the first embodiment.
Figure 3B:
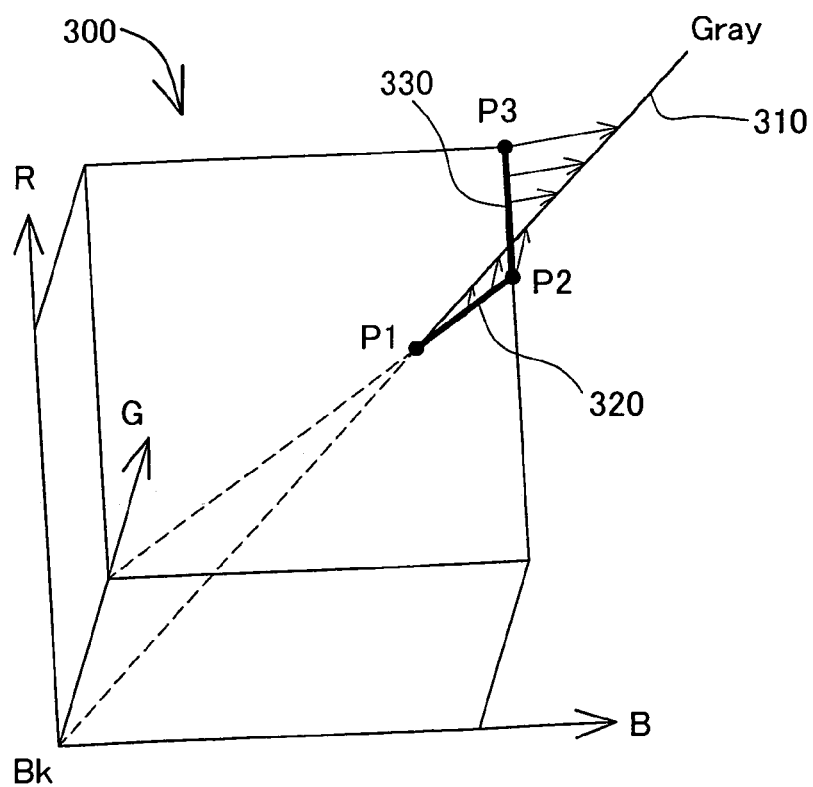

FIGS. 3a and 3b are illustrations showing a model explaining of the color suppression process. FIG. 3a is a model depiction of the CCDRGB color space. The CCDRGB color space 300 (hereinafter termed color space 300) is a set of signals that is able to be represented when shot by the CCD. As shown in the drawing, in a color coordinate system having as its axes the three color components of color signals, namely, the R component, the G component, and the B component, the color space 300 assumes three-dimensional, generally cubic form. In the color space 300, "Black (Bk)" is the point at which the values of all color signals are "0", i.e. at which chroma is "0" and luminance is "0", and this value represents the origin of the color coordinate system. The achromatic axis 310 is the axis of "0" values for chroma defined on the basis of an illuminant specified by the user. However, the arrangement is not limited to one of being set by user specification; the achromatic axis could instead be set using illuminant information defined from Exif information included in the image data.

In the CCD which constitutes the image sensor of the first embodiment there is disposed a filter that transmits the RGB color components. Since transmittance through the filter differs by color component, color component do not reach saturation when at the same level, but instead reach saturation individually. In the color space 300 of the first embodiment, when bright achromatic color such as white is photographed, saturation is reached in the order G component, B component, R component. As shown in the drawing, let the point at which the G component reaches saturation be designated as saturation point P1, the point at which the B component reaches saturation as saturation point P2, and the point at which the R component reaches saturation as saturation Point P3. Let the saturation segment joining saturation points P1 and P2 be designated saturation segment 320, and similarly let the saturation segment joining saturation points P2 and P3 be designated saturation segment 330.

Signal values on the saturation segments 320, 330 are mapped to signal values that correspond to signal values on the saturation segments 320, 330 on the achromatic axis 310. Specifically, this is achieved by making color component ratios of signals on the saturation segment 320 identical to color component ratios of signals on the achromatic axis 310. Since on the saturation segment 320 the G component is at saturation, the G component is varied to set color component ratios for the three colors, which will be identical to the signal color component ratios of signals on the achromatic axis. On the saturation segment 330, since the G component and the B component are at saturation, in similar way the G component and the B component will be varied to set color component ratios identical to color component ratios of signals on the achromatic axis.

FIG. 3b is a diagonal view of the color space 300 shown in FIG. 3a, viewed from above on the diagonal. For signals on the saturation segment 320, since the G component is varied, these are mapped onto the achromatic axis 310 while moving perpendicular to the G axis direction. For signals on the saturation segment 330, since the G component and B component increase, these are mapped onto the achromatic axis 310 while moving in a direction combining change in the G component and increase in the B component. In the first embodiment, the "displacement level" entailed in mapping refers to the "shift level" taught in the invention.

The color suppression processing module 152 of the first embodiment maps signal values on the saturation segments 320, 330, as well as color signals present surrounding the saturation segments 320, 330. The displacement level entailed in mapping of color signals present surrounding the saturation segments 320, 330 is determined so as to be inversely proportional to distance from the saturation segments. That is, for signals present in areas in proximity to the saturation segments 320, 330, mapped with preserving the continuity of original signals in the direction towards the achromatic axis 310. Chroma of signals on the saturation segments 320, 330 changes precipitously before and after the mapping process, so by also mapping nearby signal, chroma gradation of original signals on the saturation segments 320, 330 and signals around the saturation segments 320, 330 are able to be preserve with a high degree of accuracy. The color suppression process of the first embodiment will be described in greater detail herein below, with reference to FIGS. 4-9.

A4. Mapping Process

FIG. 4 is a flowchart explaining the color suppression process in the first embodiment. The process is performed by the color suppression processing module 152. As shown at upper right in the drawing, in the color space 300, let an arbitrary color signal value be denoted as D(r, g, b), let the converted signal having been subjected to the color suppression be denoted as D(r', g', b'), and let the signal ratios of the R signal, G signal, and B signal of the achromatic axis 310 be denoted as Rg, Gg, Bg; and let the R component saturation value be denoted as Rs, the G component saturation value as Gs, and the B component saturation value as Bs.

In order to reduce the volume of calculations, the color suppression processing module 152 initially performs normalization so that when signal values of the three colors in the color space 300 are equal quantities, achromatic color results (Step S10). The computational equation is given below.

$$ra = r/Rg;$$

$$ga = g/Gg;$$

$$ba = b/Bg;$$

$$Rsa = Rs/Rg;$$

$$Gsa = Gs/Gg;$$

$$Bsa = Bs/Bg; \quad \text{Eq. (1)}$$

Figure 5:
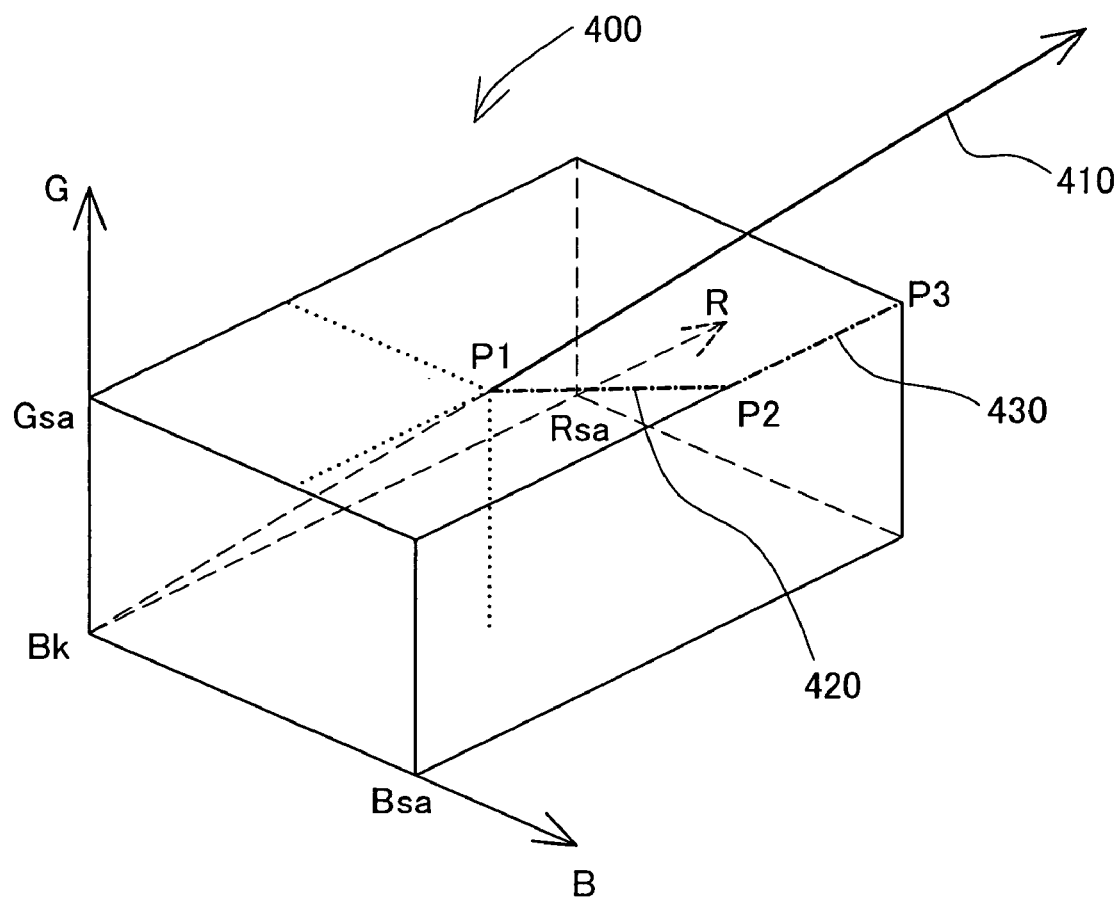
FIG. 5 schematically illustrates a color space during the color suppression process in the first embodiment.

FIG. 5 is a color space 400 derived by normalization of color space 300. The space is derived by the process of Step S10 of FIG. 4. The achromatic axis 410 represents a set of signal values giving chroma of "0" in the color space 400. At saturation point P1, when the three color components are equal quantities, the G component is saturated. The saturation segments 420, 430 indicated by the dashed lines in the drawing are segments corresponding to the saturation segments 320, 330.

The description now continues referring back to FIG. 4. The color suppression processing module 152 selects, from the area surrounding the saturation segment 430, an area to be targeted for mapping (Step S11). The color suppression processing module 152 executes the process by applying Eq. (2).

$$ra + ba > 2*Bsa \text{ and}$$

$$ra \leq Rsa \text{ and}$$

$$ba \leq Bsa; \quad \text{Eq. (2)}$$

Next, the color suppression processing module 152 expands the B component of the color signals in the area selected by Eq. (2) (Step S12). The color suppression processing module 152 executes the process by applying Eq. (3).

$$ra = ra;$$

$$ba = ra + 2*ba - 2*Bsa; \quad \text{Eq. (3)}$$

Figure 6B:
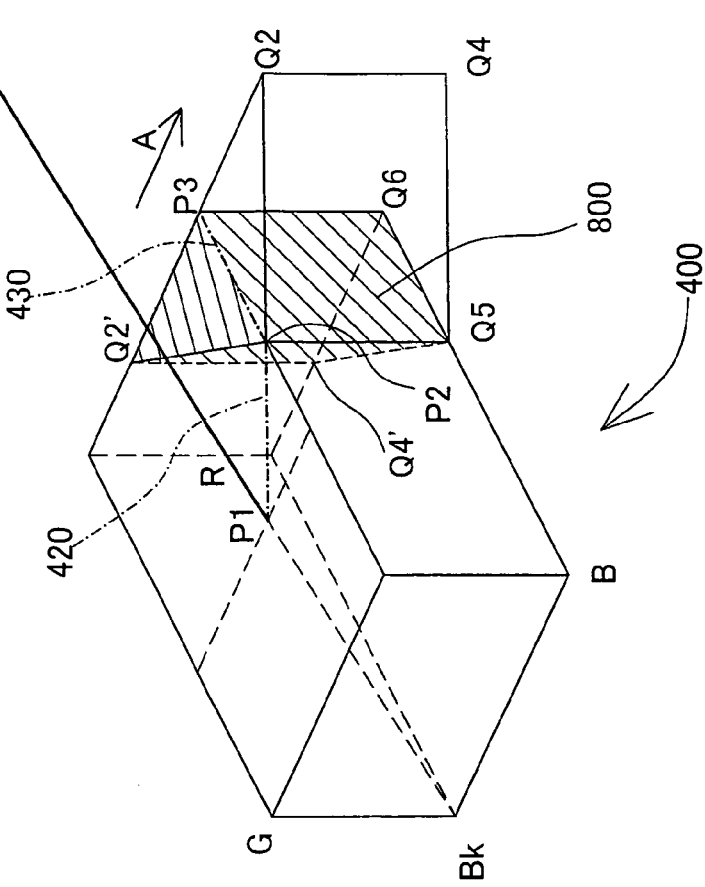
FIGS. 6a and 6b schematically illustrate the mapping process in the first embodiment.
Figure 6A:
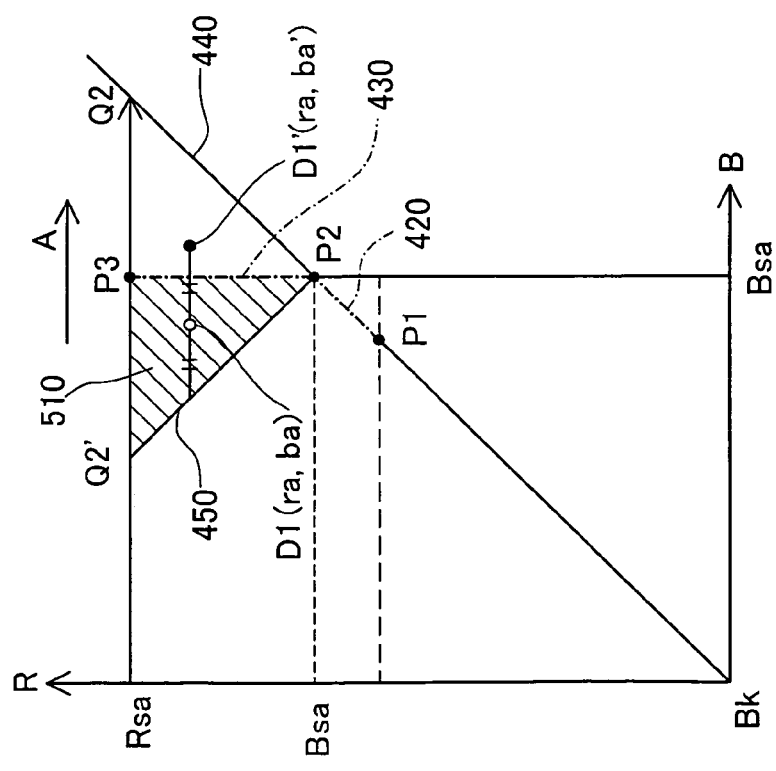

FIGS. 6a and 6b show schematically the mapping process performed by the color suppression processing module 152; the process is performed in Steps S11-S12 of FIG. 4. FIG. 6a explains the B-R coordinate system 500 of the first embodiment, having Bk as the origin. Achromatic line 440 is a straight line which is an extension of the saturation segment 420. Line 450 is a straight line symmetrical to the achromatic line 440, with respect to the saturation segment

430. The line 450 can be represented by the following equation.

$$ra + ba = 2Bsa;$$

That is, the area represented by Eq. (2) is the area 510 indicated by hatching in the drawing, and has signals whose R, B components have values included in P2-P3-Q2'. Eq. (3) is an equation for varying the B component irrespective of the G component, to shift any signal D1(ra, rb) in area 510 to D1'(ra, ba').

FIG. 6b is the color space 400 after Eq. (3) has been performed. As shown, signals within the candidate area for mapping 800 included Q2-P3-P2-Q5-Q6-Q4' are shifted in the direction of arrow A, and mapped into an area included Q2-P3-P2-Q5-Q6-Q4.

The description now continues referring back to FIG. 4. The color suppression processing module 152 now selects, from among areas surrounding the saturation segment 420, an area targeted for mapping (Step S13). The color suppression processing module 152 executes the process by applying Eq. (4).

$$ra + ga > 2*Gsa \text{ and}$$

$$ra - ba \leq 0 \text{ and}$$

$$ra \leq Rsa \text{ and}$$

$$ga \leq Gsa; \quad \text{Eq. (4)}$$

The color suppression processing module 152 now expands the G component of the color signals in the area selected by Eq. (4) (Step S17). The color suppression processing module 152 executes the process by applying Eq. (8).

$$ra' = ra;$$

$$ga' = ra + 2*ga - 2*Gsa;$$

$$ba' = ba; \quad \text{Eq. (8)}$$

Figure 7B:
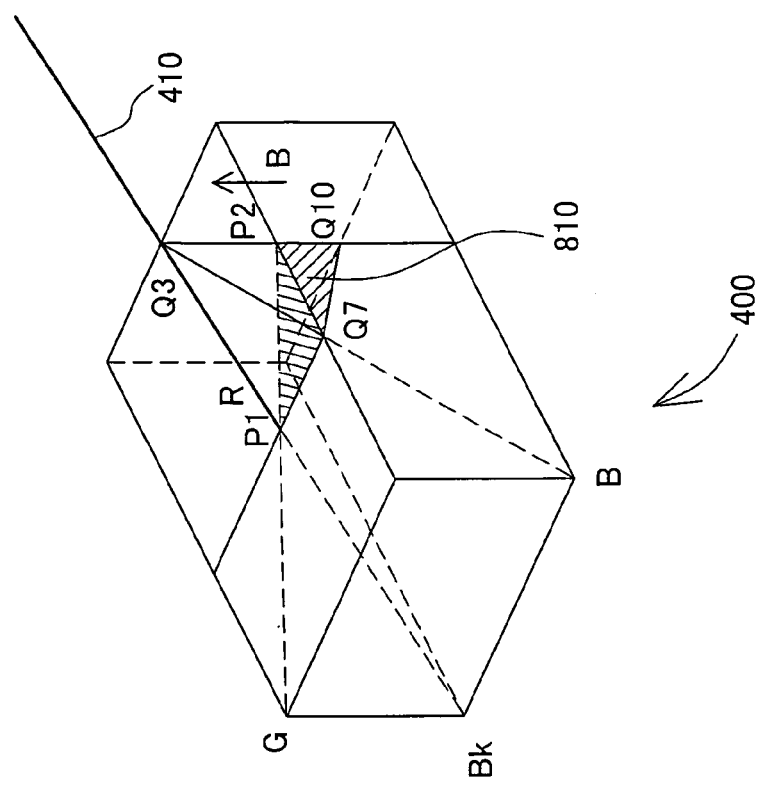
FIGS. 7a and 7b schematically illustrate the mapping process in the first embodiment.
Figure 7A:
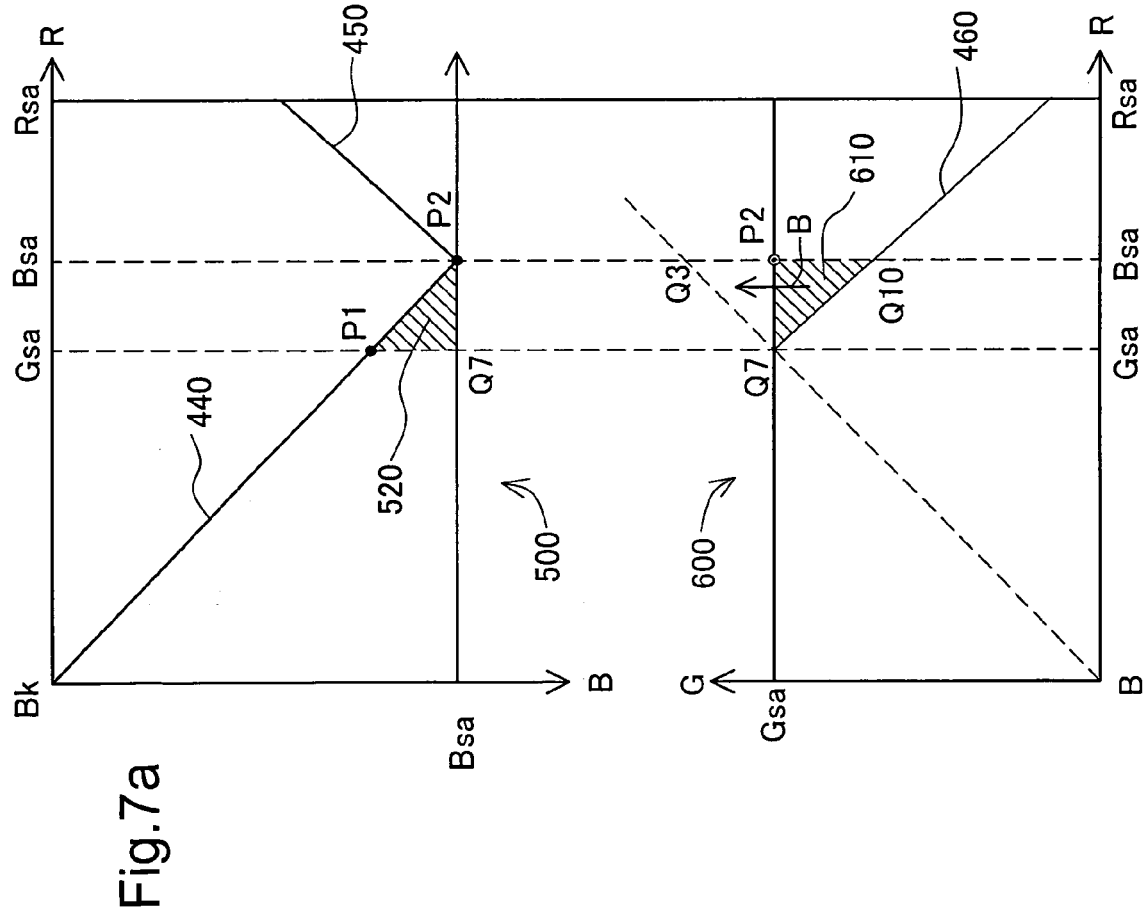

FIGS. 7a and 7b are illustrations showing the mapping process in the first embodiment; the process is performed in Steps S13, S17 of FIG. 4. FIG. 7a explains the B-R coordinate system 500 of the first embodiment, having Bk as the origin; and an R-G coordinate system 600. Line 460 is represented by the following equation.

$$ra + ga = 2*Gsa;$$

That is, the area represented by Eq. (4) includes the areas 520 and 610 indicated by hatching in FIG. 7a, and is an area comprising a set of signals whose R, B components have values included in P1-P2-Q7, and signals whose R, G components have values included in P2-Q7-Q10.

As shown in FIG. 7b, signals within the candidate area for mapping 810 included P1-P2-Q7-Q10 are shifted in the direction of arrow B, and mapped into an area included P1-P2-Q7-Q3.

The description now continues referring back to FIG. 4. The color suppression processing module 152 now selects, from among areas surrounding the saturation segment 430, an area targeted for mapping (Step S14). The color suppression processing module 152 executes the process by applying Eq. (5) (Step S14).

$$ga + ba > 2*Gsa \text{ and}$$

$$ra - ba \leq 0 \text{ and}$$

$$ga \leq Gsa \text{ and}$$

$$ba \leq Rsa; \quad \text{Eq. (5)}$$

The color suppression processing module 152 now expands the G component of the color signals in the area selected by Eq. (5) (Step S18). The color suppression processing module 152 executes the process by applying Eq. (6).

$$ra' = ra;$$

$$ga' = ra + 2*ga - 2*Gsa;$$

$$ba' = ba; \quad \text{Eq. (6)}$$

Figure 8B:
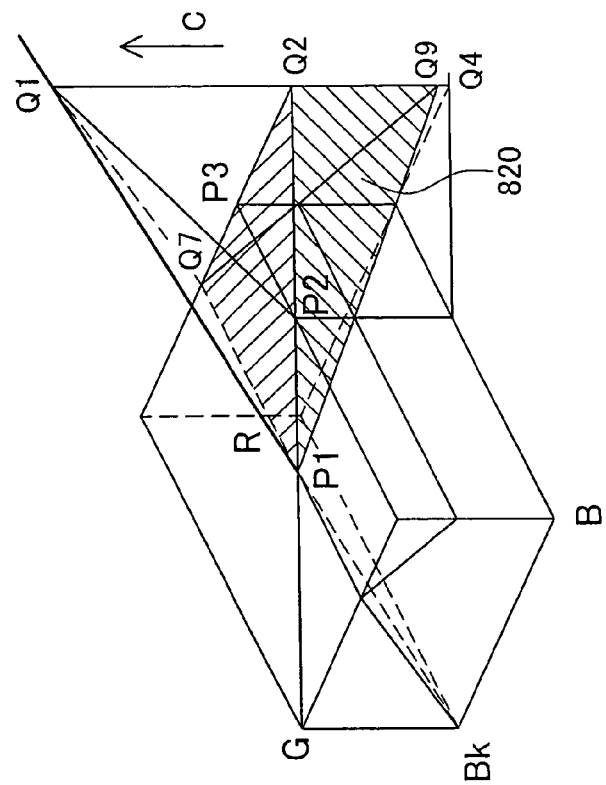
FIGS. 8a and 8b schematically illustrate the mapping process in the first embodiment.
Figure 8A:
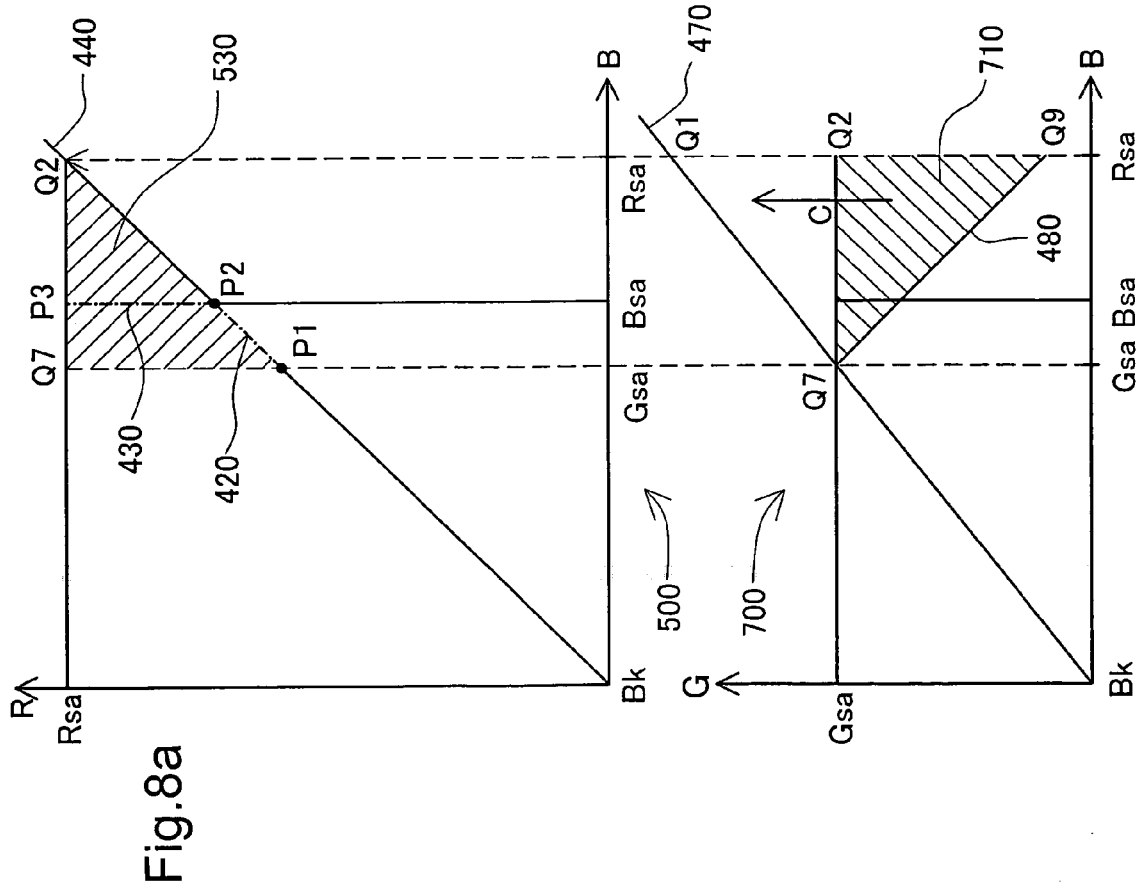

FIGS. 8a and 8b are illustrations explaining in model fashion the mapping process in the first embodiment; the process is performed in Steps S14-S15 of FIG. 4. FIG. 8a explains the B-R coordinate system 500 of the first embodiment, having Bk as the origin; and a B-G coordinate system 700. Line 480 is represented by the following equation.

$$ga + ba = 2*Gsa;$$

That is, the area represented by Eq. (5) includes the areas 530 and 710 indicated by hatching in FIG. 8a, and is an area comprising a set of signals whose R, B components have values included in P1-Q2-Q7, and signals whose G, B components have values included in Q7-Q2-Q9. The area is the candidate area for mapping 820 shown hatched in FIG. 8b.

In FIG. 8b, as shown in the drawing, signals within the candidate area for mapping 820 included P1-Q7-Q2-Q9 undergo variation of the G component and shifting in the direction of arrow C, becoming mapped in the area included P1-Q7-Q2-Q1.

The description now continues referring back to FIG. 4. The color suppression processing module 152 preserves as-is color signals within areas other than the candidate areas for mapping (Step S16). The color suppression processing module 152 executes the process by applying Eq. (7).

$$ra' = ra;$$

$$ga' = ga;$$

$$ba' = ba; \quad \text{Eq. (7)}$$

The color suppression processing module 152 performs a process to return to the original color space 300 from the normalized color space 400 (Step S18). The color suppression processing module 152 executes the process by applying Eq. (9).

$$r' = ra'*Rg;$$

$$g' = ga'*Gg;$$

$$b' = ba'*Bg; \quad \text{Eq. (9)}$$

Figure 9A:
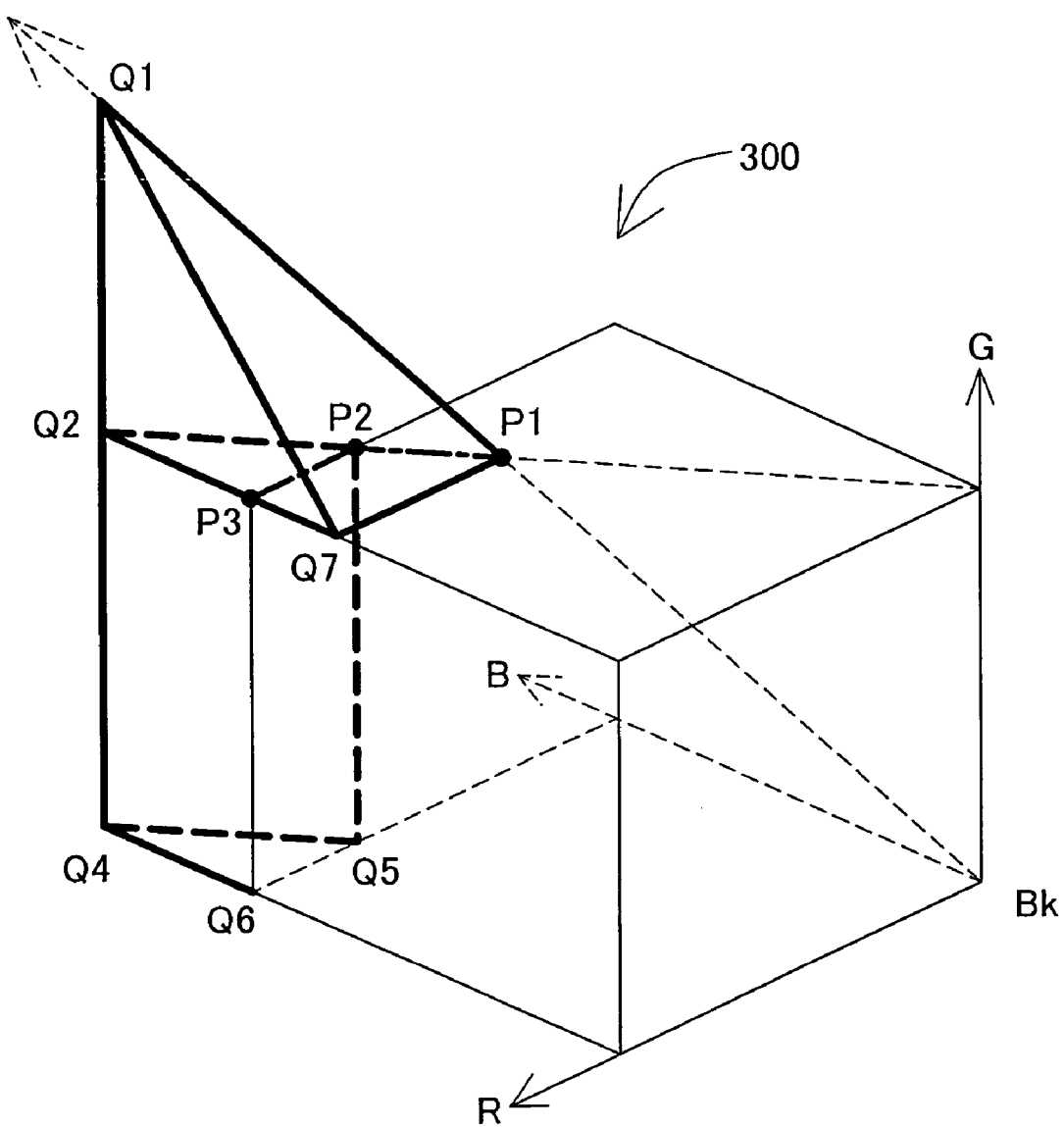
FIGS. 9a and 9b schematically illustrate a color space after the color suppression process in the first embodiment.
Figure 9B:
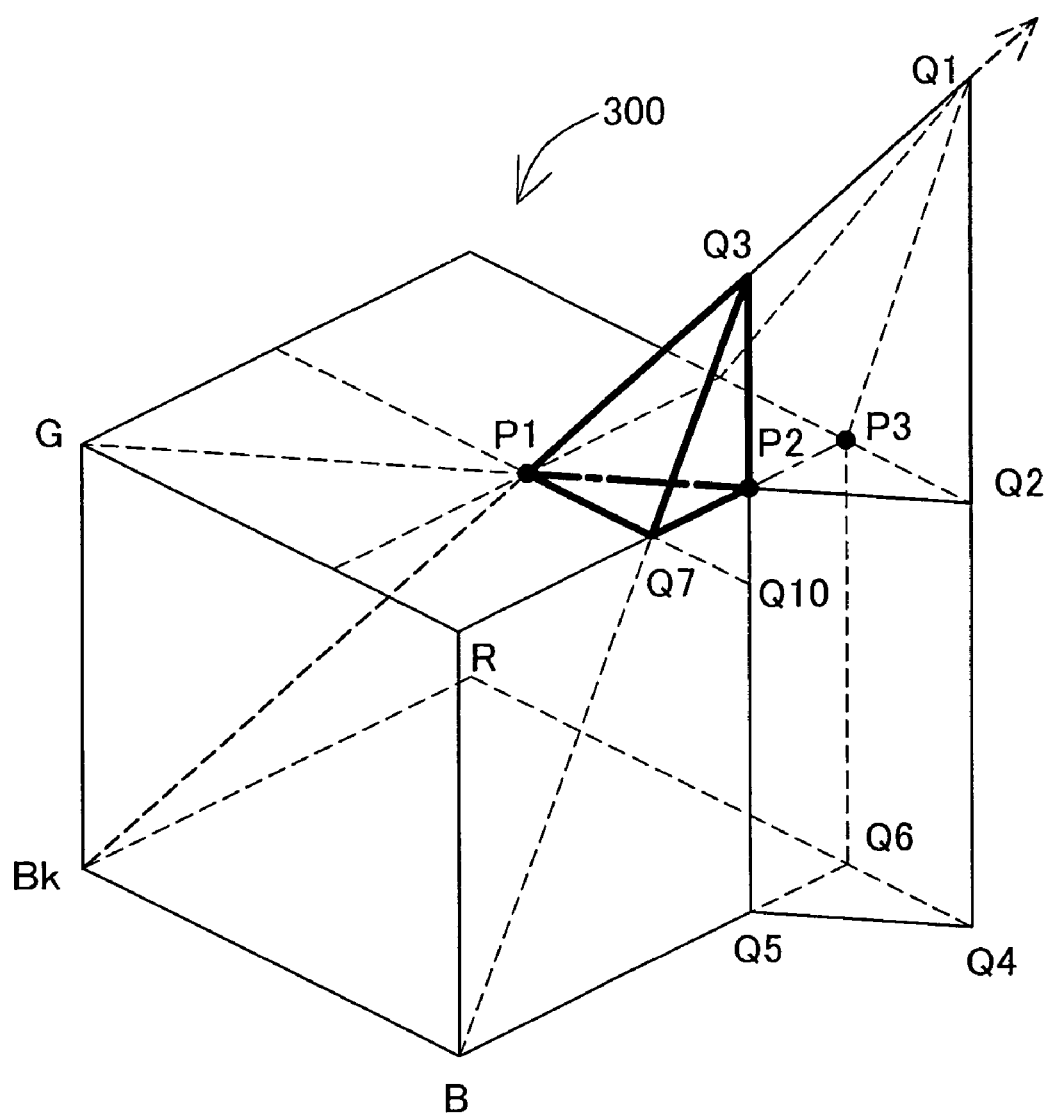

The color space 300 on which the above process has been performed is shown in FIGS. 9a and 9b. FIG. 9a is an illustration explaining the color space 300 after the mapping process, viewed from the R component side. The area indicated by the heavy lines in the drawing (P1-Q7-Q2-Q1 and P2-Q2-P3-Q6-Q5-Q4) is the area to which signals on the saturation segment 330 and signals surrounding the saturation segment 330 are mapped, and represents the area mapped in Steps S12, S15 of FIG. 4. FIG. 9b is an illustration explaining the color space 300 after the mapping process, viewed from the B component side. The area indicated by the heavy lines in the drawing (P1-P2-Q7-Q3)

is the area to which signals on the saturation segment 320 and surrounding signals are mapped.

The color suppression processing module 152 compresses and transfers the image data 10 subjected to the above processing, so that conversion processing will be able to be performed in the color conversion processing module 153.

Figure 10:
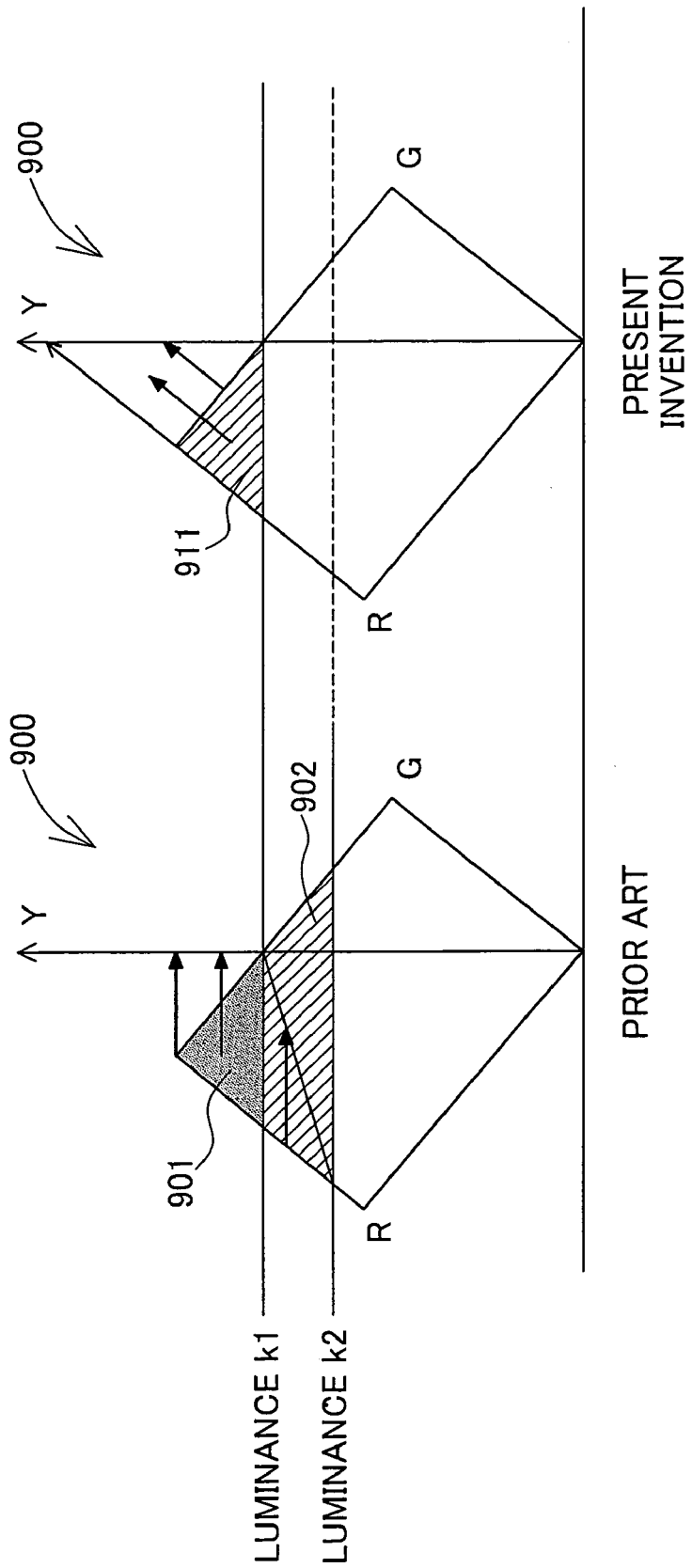
FIG. 10 is an illustration showing the effects of the color suppression process in the first embodiment.

According to the image processing device of the first embodiment set forth hereinabove, it is possible to restrain the occurrence of false color with preserving chroma gradations, even when bright achromatic color is photographed. FIG. 10 is an illustration explaining the effects of the color suppression process in the first embodiment. In FIG. 10 are shown a mapping model 900 that relies on prior art technique, and a mapping model 910 according to the teachings of the invention.

The mapping model 900 explains the result of suppressing chroma over a wide spectrum. As shown in the drawing, all signals in an area 902 of luminance k2 and above (hatched module) and a high luminance area 901 have a constant level of decline in chroma. Thus, all signals in the high luminance area 901 of luminance k1 and above (the gray area) have chroma of "0" and are mapped to the achromatic axis Y. Accordingly, chroma changes precipitously, and color loss sometimes occurs.

In the present invention, as shown by the mapping model 910, the displacement level entailed in mapping varies continuously. Since, chroma gradations is able to be preserved with high accuracy before and after, the image processing device is able to map to perform natural-looking tone reproduction, and is able to restrain the occurrence of false color.

In the present invention, since a candidate area for mapping is set on the basis of the achromatic axis and saturation segments, the area is able to be set easily, and the calculation load is able to be reduced.

B. Second Embodiment

In the first embodiment, the color suppression process is performed using Rg, Gg, Bg which denote R, G, B color component ratios when an achromatic color subject is photographed. In the second embodiment, the color suppression process is performed with consideration given to gain level used in the white balance process. The white balance process is a process for preventing a photographed image from assuming color cast different from the actual color of the subject due to a different illuminant, and is executed by multiplying the color component values by different gain levels, depending on the illuminant.

In this second embodiment, the process indicated below is performed. Using gain level established in association with any particular specified illuminant, adjustment is performed such that R, G, B color component values of coordinate points on the achromatic axis are identical, and the achromatic axis is established on an identical axis to an achromatic axis defined on the basis of the specified illuminant. The color suppression process is performed on the basis of the established achromatic axis. Different values are established for gain level, depending on the illuminant.

In this second embodiment, the digital camera 200 is equipped with a function whereby, on the basis of user input, illuminant data that identifies the illuminant at the time of shooting is set in the image data 30. On the basis of an environmental condition set in the image data 30, the image processing device 100 carries out the white balance process. The following detailed description of environmental conditions makes reference to FIGS. 11a, 11b, and 11c.

B1. Illuminant Information

FIGS. 11a, 11b, and 11c explain environmental conditions in the second embodiment. FIG. 11a is an illustration explaining the method for setting environmental conditions. A liquid panel DSP and a control pad 210 are provided on the back of the digital camera 200. The control pad 210 has control buttons 201, 202, 203, 204, and 205. The user who is shooting pictures with the digital camera 200 operates the control buttons 201-205 prior to shooting, to display an environmental condition Settings menu on the liquid panel DSP. In the drawing, the environmental condition Settings menu is shown on the liquid panel DSP.

As shown in the drawing, the environmental conditions "sunny", "cloudy" etc. are displayed, together with radio buttons 221, 222, 223, 224. The user operates the control buttons 201-205 to select the desired environmental condition. In the second embodiment, "sunny" has been selected as the environmental condition.

FIG. 11b is an illustration showing an exemplary data arrangement of the image data 30. The image data 30 has Exif information 31 and data 32. The environmental condition set at the time of shooting is set in the Exif information 31. The following description of an example of Exif information content makes reference to FIG. 11c.

FIG. 11c is an illustration showing exemplary settings in the Exif information 31. As illustrated, the Exif information 31 records information relating to the image data 30 such as "image title" and "shooting date" as well as the shooting environment at the time the image data 30 was shot, such as "illuminant information", "color space information", "ISO sensitivity", "exposure time", "subject distance", "focal distance" and the like. As indicated by the broken lines in the drawing, the "illuminant information" of the image data 30 has been set to "sunny." The Exif information 31 is able to be easily referenced, and various values are able to be acquired, making it suitable as material for deciding illuminant information.

B2. Functional Blocks

Figure 12:
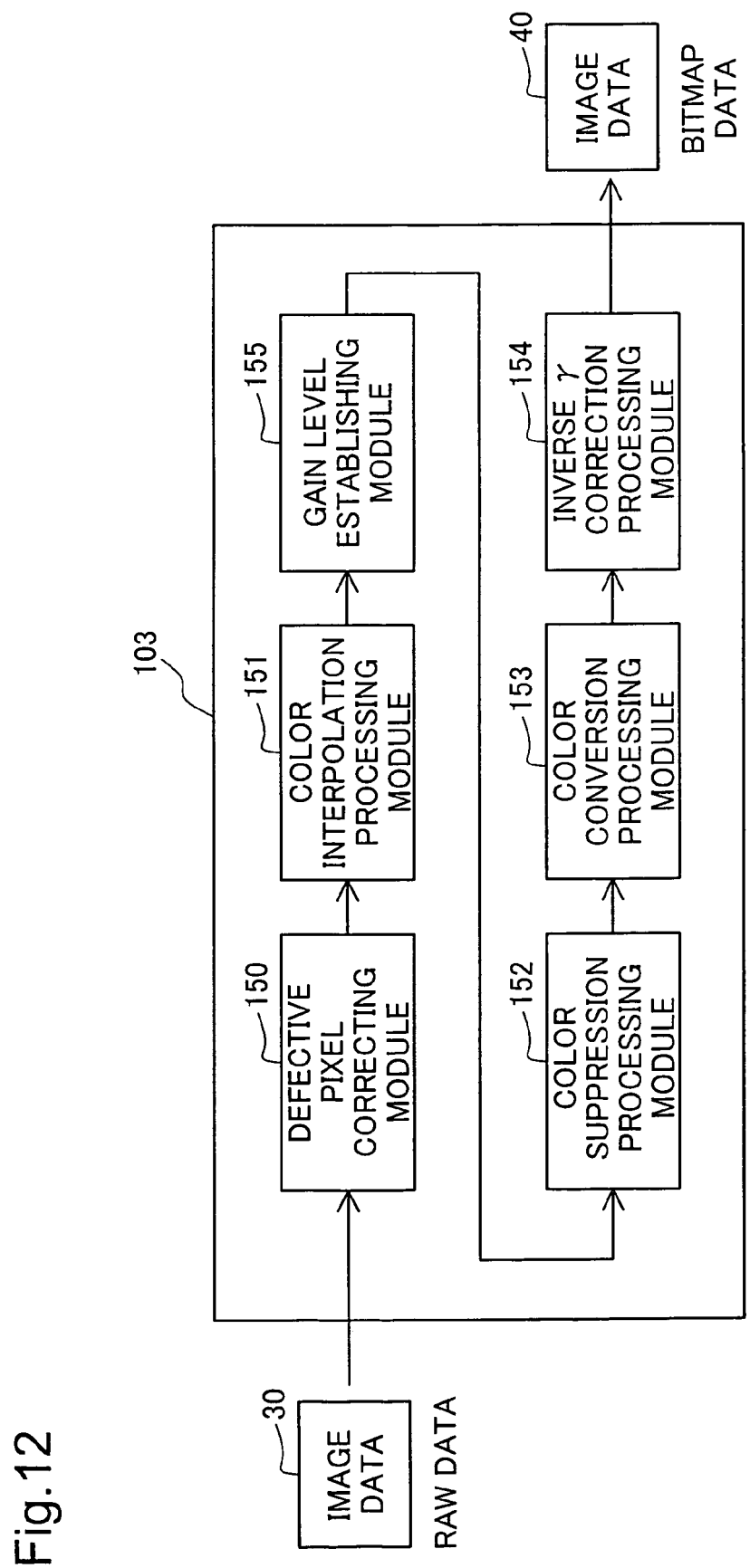
FIG. 12 is a block chart showing the specifics of image processing in the second embodiment.

FIG. 12 is a block chart explaining the specifics of image processing in this second embodiment. After the color complement processing module 151, processing is performed by a gain level setting module 155 that performs a process to set gain level. The color suppression processing module 152, using the set gain level, adjusts the color component values of the achromatic axis to carry out the color suppression process. The specifics of the arrangement of the gain level setting module 155 are described with reference to FIG. 13a and FIG. 13b.

Figures 13A, 13B:
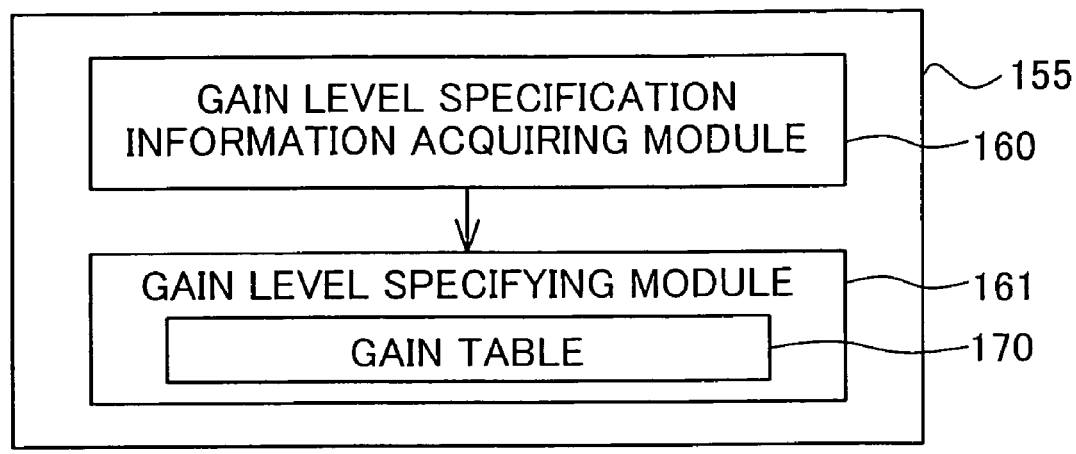
FIG. 13a is function blocks showing the gain level setting module in the second embodiment.
FIG. 13b is an illustration showing a gain table in the second embodiment.

FIG. 13a and FIG. 13b are illustrations showing specific function blocks of the gain level setting module 155 in the second embodiment. The gain level setting module 155 has gain level specification information acquiring module 160, and a gain level specifying module 161.

The gain level specification information acquiring module 160 refers to the Exif information 31 of the image data 30 to acquire "illuminant information." In this second embodiment, "sunny" is recorded in the "illuminant information" of the Exif information 31.

The gain level specifying module 161 has a gain table 170. The specifics of the gain table 170 are shown in FIG. 13b. As shown in FIG. 13b, the gain table 170 represents gain levels of color signals defined according to type of illuminant. The gain table 50 has "illuminant type", "Rgain", "Ggain", and "Bgain." "Illuminant type" represents the type of illuminant. "Rgain" denotes gain level of the R signal, "Ggain" denotes gain level of the G signal, and Bgain"

denotes gain level of the B signal. For example, where the illuminant type is "incandescent" the gain levels are "Rgain" of "1.20", "Ggain" of "1.00", and "Bgain" of "2.44."

The gain level specifying module 161 acquires the "illuminant information" from the gain level specification information acquiring module 160, and identifies a gain level corresponding to the acquired "illuminant information." In this second embodiment, since the gain level specifying module 161 has acquired the information "sunny" as the illuminant information from the gain level specification information acquiring module 160, the gain level for the illuminant type "sunny" is used. As shown in the drawing, for image data set with the illuminant type "sunny", gain levels when carrying out the white balance process are "Rgain" of "1.90", "Ggain" of "1.00", and "Bgain" of "1.71." The following description of the specifics of the color suppression process using gain levels identified in this way refers to FIG. 14

B3. Color Suppression Process

FIG. 14 is a flowchart explaining the color suppression process in the second embodiment. The color suppression processing module 152 begins the process when it acquired gain levels from the gain level setting module 155.

The color suppression processing module 152 applies the following Eq.(10) to make identical the color component ratios of the three colors R, G, B of coordinate points on the achromatic axis (Step S20).

$$Rg=1/Rgain;$$

$$Gg=1/Ggain;$$

$$Bg=1/Bgain; \quad \text{Eq.(10)}$$

Using Rg, Gg, Bg calculated with Eq. (10), the color suppression processing module 152 executes the color suppression process (Steps S21-S29). The process from Step S21-Step S29 is a process similar to the process of Steps S10-S17 of FIG. 4 of the first embodiment, and will not be described in any detail.

The color suppression processing module 152 applies the following Eq.(11) to calculate coordinate points of the color space after the color suppression process (Step S29).

$$r'=ra';$$

$$g'=ga';$$

$$b'=ba'; \quad \text{Eq. (11)}$$

According to the image processing system of second embodiment described hereinabove, using gain levels employed in the white balance process, adjustments are made so that color component values of the three colors of coordinate points on the achromatic axis become identical, and the color suppression process is then executed on the basis of the adjusted achromatic axis. Accordingly, in image data shot under various illuminants, the color suppression process is able to be performed on the basis of the appropriate achromatic axis, so that tone reproduction is able to be performed with high accuracy.

Also, in this second embodiment, since illuminant information is acquired from Exif information that is recorded in the image data, illuminant information is able to be acquired easily, and the processing load on the image processing device is able to be reduced.

C. Variations (1)

In First embodiment, saturation takes place in the order G-B-R, but is not limited to this. With the color suppression processing method of the present invention, it is possible to achieve natural-looking tone reproduction regardless of the order of saturation.

(2)

In The first embodiment, an RGB color coordinate system is employed as the color coordinate system based on color signals of three colors, but the invention is not limited to this, it being possible to employ other color coordinate systems. In the first embodiment, an area is set as a candidate for mapping on the basis of saturation segments and the achromatic axis, but it would be acceptable instead for the user to specify an arbitrary area. An area of less than a predetermined a distance from the saturation segments or the like would be acceptable as well.

(3)

In the second embodiment, illuminant information set at the time of shooting image data is recorded in the Exif information, to which reference is made to acquire the illuminant information and set gain levels; however, this arrangement is not limiting. For example, the illuminant should be set arbitrarily at the time of image processing by the image processing device 100. In this case, as shown in FIG. 15 for example, a screen WD that prompts the user to select a shooting condition could be displayed on the display of the image processing 100, and the user prompted to make a selection.

Figure 15:
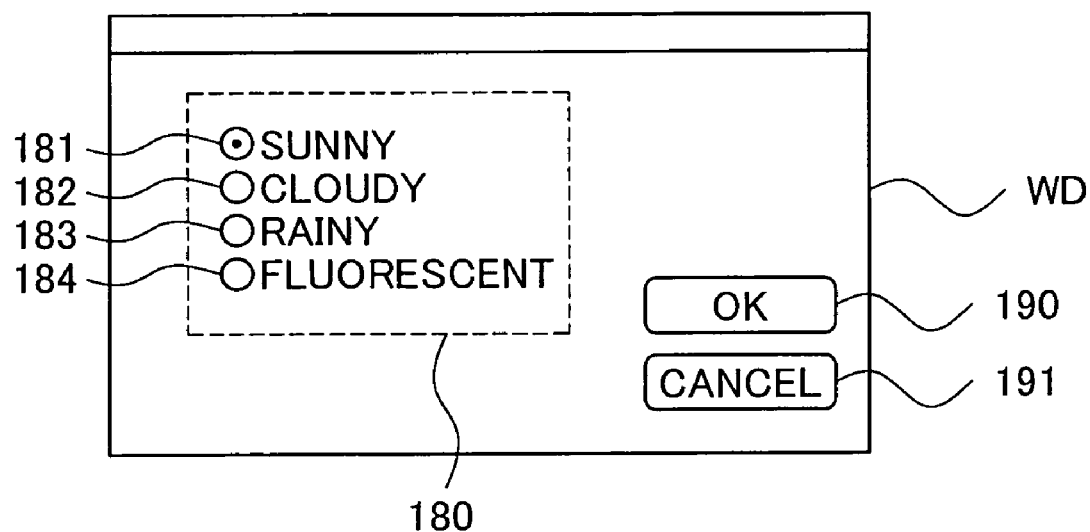
FIG. 15 is a screen example showing an exemplary Settings screen for illuminant information in a Variation.

FIG. 15 is a screen example showing an exemplary Settings screen for illuminant information in this variation. The screen WD has an illuminant information selection module 180, an OK button 190, and a Cancel button 191. As illustrated, the illuminant information selection module 180 displays as illuminant information "sunny", "cloudy" etc., together with radio buttons 181, 182, 183, and 184. The user selects the radio button for the desired illuminant and presses the OK button 190. If it is desired to cancel the illuminant information selection process, the Cancel button 190 is pressed. In the drawing, "sunny" is shown selected as the illuminant information.

According to this variation, even if illuminant information has not been set at the time of shooting, illuminant information is able to be set easily after the fact to set gain levels, so that convenience is able to be improved.

(4)

In the second embodiment, making reference to illuminant information recorded in Exif information, gain levels are set on the basis of a gain table 170 provided in advance, but this arrangement is not limiting. For example, it would be acceptable to analyze pixel values of image data and calculate gain levels on the basis of the results of the analysis. In this case, this could be realized by means of a process such as the following.

Figure 16:
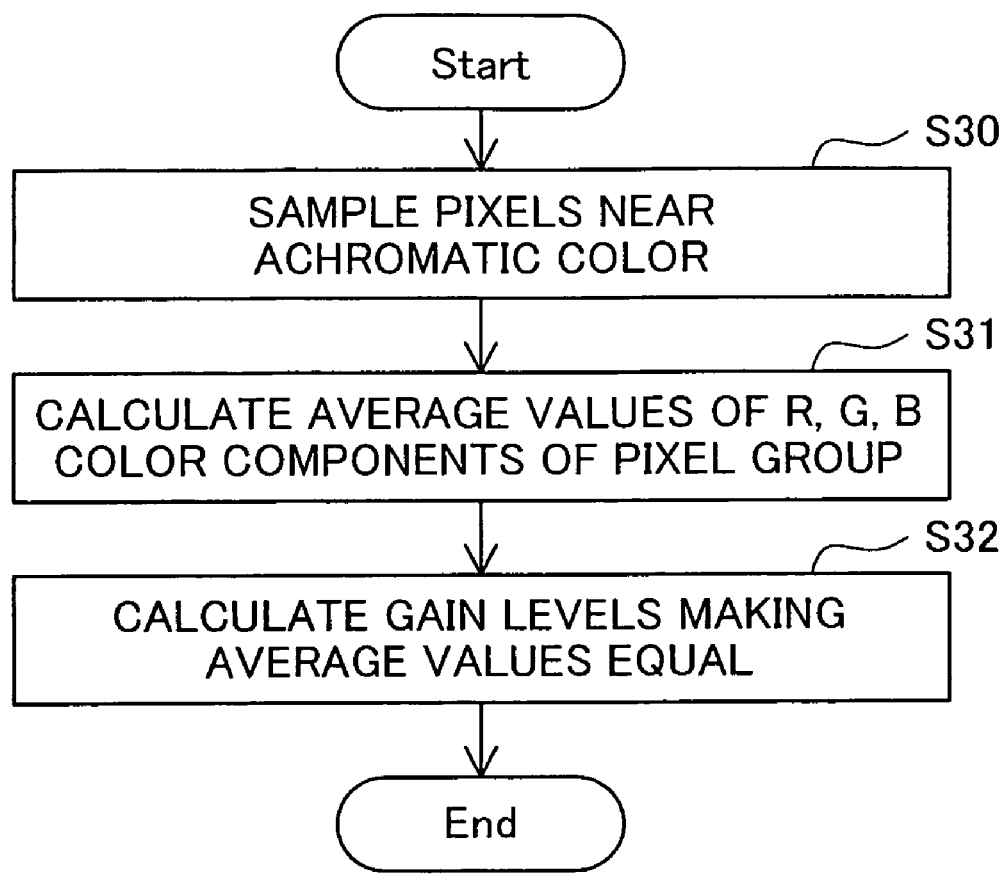
FIG. 16 is a flowchart showing the gain level calculation process in a Variation.

FIG. 16 is a flowchart of the gain level calculation process in this variation. The process begins when the gain level setting module 155 receives image data that has been subjected to color complement by the color complement processing module 151.

The gain level setting module 155 samples pixels in the image data 30, in proximity to where an achromatic subject is photographed (Step S30), and calculates average values of the R, G, B color component values of the pixel group (Step S31). The gain level setting module 155 calculates gain level for each of the R, G, B color components, such that the calculated average values are equal (Step S32).

Using the gain levels calculated by means of the above process, the color suppression processing module 152 executes the color suppression process.

According to this variation, since appropriate gain levels are able to be calculated flexibly, the accuracy of tone reproduction is able to be improved.

Although the present invention has been described and illustrated in detail, it is clearly understood that the same is by way of illustration and example only and is not to be taken by way of limitation, the spirit and scope of the present invention being limited only by the terms of the appended claims.

The Japanese patent applications as the basis of the priority claim of this application are incorporated in the disclosure here of by reference:

(1)Japanese Patent Application No. 2004-101896(filing data: Mar. 31, 2004).

(2)Japanese Patent Application No. 2004-306417(filing data: Oct. 21, 2004).

What is claimed is:

1. An image processing method of processing an image data being presented in a color space that is defined with color components of three colors, the method comprising:

mapping a first part and a second part of color signal to an achromatic axis defined on the basis of an arbitrary illuminant, wherein one color is saturated in the first part of the signal and two colors are saturated in the second part of the signal; and mapping a surround color signal surrounding the saturated color signal so as to preserve chroma gradations of the surround color signal, toward the achromatic axis.

2. An image processing method implemented by an image processing device when the image processing device photographed bright achromatic color, in a color coordinate system defined by color components of three colors, the method comprising:

defining a first saturation point at which, of the color components of three colors, a first color component is saturated, a second saturation point at which the first color component and a second color component are saturated, and a third saturation point at which the first color component, the second color component, and a third color component are saturated;

mapping signal on saturation segments that are configured by connecting the first saturation point and the second saturation point, and the second saturation point and the third saturation point, to an achromatic axis defined on the basis of an arbitrary illuminant;

setting an area of predetermined range from the saturation segments as a candidate area for mapping; and mapping color signal within the candidate area for mapping toward the achromatic axis, with varying the shift level associated with mapping, depending on distance from the saturation segments to color signal within the candidate area for mapping.

3. An image processing method in accordance with claim 2 wherein, the shift level is determined in inverse proportion to distance from the saturation segments.

4. An image processing method in accordance with claims 1 wherein, the arbitrary illuminant includes an illuminant configured on the basis of the environment when the image data was shot.

5. An image processing method in accordance with claims 1, further comprising:

setting the achromatic axis at a designated illuminant achromatic axis which is an achromatic axis defined on the basis of a designated illuminant.

6. An image processing method in accordance with claim 5, further comprising:

setting adjustment values for the purpose of adjusting color components of the three colors;

setting the achromatic axis on the same axis as the designated illuminant achromatic axis, by adjusting color component values of coordinate points on the achromatic axis on the basis of the adjustment values; and the mapping onto the achromatic axis and mapping toward the achromatic axis, on the basis of the set achromatic axis.

7. An image processing method in accordance with claim 6, further comprising:

inputting defining information of adjustment value for the purpose of defining the adjustment values; and storing adjustment value management information that associates the defining information of adjustment value and the adjustment values in a memory; and wherein, the setting of the adjustment values is implemented on the basis of the input defining information of adjustment value and the adjustment value management information.

8. An image processing method in accordance with claim 6 wherein, the setting of the adjustment values is implemented on the basis of analytical result of the image data.

9. An image processing method in accordance with claim 8 wherein, the setting of the adjustment values is implemented so as to make average values of each the color component of the color components of three colors in a pixel group in proximity to achromatic color of the image data equal quantities.

10. An image processing method in accordance with claim 8, further comprising:

storing adjustment value management information that associates the adjustment values with the adjustment value defining information, which is information for the purpose of defining the adjustment values; and wherein, the setting of the adjustment values is implemented on the basis of the adjustment value defining information acquired by the analysis and the adjustment value management information.

11. An image processing method in accordance with claim 10 wherein, the adjustment value defining information has been set in advance in the image data.

12. An image processing device for processing an image date presented in a color space that is defined with color components of three colors, the image processing device comprising:

a first mapping process module that maps a first part and a second part of color signal to an achromatic axis defined on the basis of an arbitrary illuminant, wherein one color is saturated in the first part of the signal and two colors are saturated in the second part of the signal; and a second mapping process module that maps a surround color signal surrounding the saturated color signal so as to preserve chroma gradations of the surround color signal, toward the achromatic axis.

13. An image processing device for processing an image data represented by a color coordinate system based on color components of three colors, the image processing device comprising:
- a saturation point defining module that defines a first saturation point at which, of the color components of three colors, a first color component is saturated, a second saturation point at which the first color component and a second color component are saturated, and a third saturation point at which the first color component, the second color component, and a third color component are saturated;
- a first mapping process module that maps color signal on saturation segments that are configured by connecting the first saturation point and the second saturation point, and the second saturation point and the third saturation point, to an achromatic axis defined on the basis of an arbitrary illuminant;
- a candidate area setting module that sets an area of predetermined range from the saturation segments as a candidate area for mapping; and
- a second mapping process module that maps color signal within the candidate area for mapping toward the achromatic axis, with varying the shift level associated with mapping, depending on distance from the saturation segments to color signal within the candidate area for mapping.

14. A storage medium wherein computer program is recorded in computer-readable form, the storage medium comprising;
- a program instruction for mapping a first part and a second part of color signal to an achromatic axis defined on the basis of an arbitrary illuminant, wherein one color is saturated in the first part of the signal and two colors are saturated in the second part of the signal; and
- a program instruction for mapping a surround color signal surrounding the saturated color signal so as to preserve chroma gradations of the surround color signal, toward the achromatic axis.

15. A storage medium wherein computer program is recorded in computer-readable form, the storage medium comprising;
- a program instruction for defining a first saturation point at which, of the color components of three colors, a first color component is saturated, a second saturation point at which the first color component and a second color component are saturated, and a third saturation point at which the first color component, the second color component, and a third color component are saturated;
- a program instruction for mapping signal on saturation segments that are configured by connecting the first saturation point and the second saturation point, and the second saturation point and the third saturation point, to an achromatic axis defined on the basis of an arbitrary illuminant;
- a program instruction for setting an area of predetermined range from the saturation segments as a candidate area for mapping; and
- a program instruction for mapping color signal within the candidate area for mapping toward the achromatic axis, with varying the shift level associated with mapping, depending on distance from the saturation segments to color signal within the candidate area for mapping.

* * * * *